(12) United States Patent
Griffin et al.

(10) Patent No.: US 8,229,515 B2
(45) Date of Patent: Jul. 24, 2012

(54) COMMUNICATION DEVICE WITH MULTIPLE DETACHABLE COMMUNICATION MODULES

(75) Inventors: Jason Tyler Griffin, Kitchener (CA); Mihal Lazaridis, Waterloo (CA); James Carl Infanti, Waterloo (CA); Peter J. Edmonson, Hamilton (CA)

(73) Assignee: Research In Motion Limited, Waterloo, Ontario ( * ) Notice: Subject to any disclaimer, the term of this patent is extended or adjusted under 35 U.S.C. 154(b) by 0 days.

(21) Appl. No.: 13/154,557

(22) Filed: Jun. 7, 2011

(65) Prior Publication Data

US 2011/0237195 A1 Sep. 29, 2011

Related U.S. Application Data

(60) Division of application No. 11/949,979, filed on Dec. 4, 2007, now Pat. No. 7,979,035, which is a continuation of application No. 10/416,322, filed as application No. PCT/CA01/01582 on Nov. 6, 2001, now Pat. No. 7,313,423.

(60) Provisional application No. 60/246,533, filed on Nov. 7, 2000.

(51) Int. Cl.
*H04M 1/00* (2006.01)
*H04B 1/38* (2006.01)
(52) U.S. Cl. ............... 455/569.1; 455/575.1; 455/575.2; 455/90.3
(58) Field of Classification Search ............... 455/575.1, 455/575.2, 569.1, 90.3
See application file for complete search history.

(56) References Cited

U.S. PATENT DOCUMENTS

| 3,633,705 | A | | 1/1972 | Teder |
| 4,677,654 | A | | 6/1987 | Lagin et al. |
| 5,590,417 | A | * | 12/1996 | Rydbeck ................... 455/575.2 |
| 5,771,438 | A | | 6/1998 | Palermo et al. |
| 5,881,149 | A | | 3/1999 | Weatherill |
| 5,943,627 | A | * | 8/1999 | Kim et al. ................. 455/569.1 |
| 5,983,100 | A | * | 11/1999 | Johansson et al. ......... 455/426.1 |
| 6,041,243 | A | | 3/2000 | Davidson et al. |
| 6,073,031 | A | * | 6/2000 | Helstab et al. ............... 455/557 |
| 6,473,630 | B1 | | 10/2002 | Baranowski et al. |
| 6,574,455 | B2 | | 6/2003 | Jakobsson et al. |
| 6,885,848 | B2 | | 4/2005 | Lee |

FOREIGN PATENT DOCUMENTS

| EP | 0840465 A2 | 5/1998 |
| WO | 94/29966 A1 | 12/1994 |
| WO | 00/62431 A1 | 10/2000 |

* cited by examiner

*Primary Examiner* — Ariel Balaoing
(74) *Attorney, Agent, or Firm* — Jones Day

(57) ABSTRACT

A wireless communication device has a docking cavity, a short-range transceiver, and a long-range transceiver for long-range wireless communication with a wireless network. A wireless communication module includes a speaker and a microphone, and a short-range transceiver for short-range wireless communication with the device's short-range transceiver. The module is configured to operate in first and second modes. In the first mode, the module is separated from the communication device. In the second mode, the module is mounted in the cavity. In both modes, communication between a user and the network is conducted through the module's microphone and speaker, both short-range transceivers and the long-range transceiver.

18 Claims, 12 Drawing Sheets

COMMUNICATION DEVICE WITH MULTIPLE DETACHABLE COMMUNICATION MODULES

CROSS-REFERENCE TO RELATED APPLICATIONS

This is a division of U.S. patent application Ser. No. 11/949,979, filed Dec. 4, 2007, which is a continuation of U.S. patent application Ser. No. 10/416,322, filed Oct. 24, 2003 (now U.S. Pat. No. 7,313,423), which was the Nationalization Stage of International Application No. PCT/CA01/01582, filed Nov. 6, 2001, which claims priority of U.S. Provisional Application No. 60/246,533, filed Nov. 7, 2000, all the above applications hereby incorporated herein by reference.

TECHNICAL FIELD

This relates to communication devices, and more particularly to wireless communication devices having multiple detachable communication modules.

BACKGROUND

There has been a proliferation of wireless mobile communication devices in recent years in the field of telecommunications. Devices such as cordless and cellular telephones, pagers, wireless modems, wireless email devices, personal digital assistants (PDAs) with communications functions, and other mobile communication devices are becoming commonplace. Known communication devices, however, are typically single-element or single-module designs. In order to enable hands-free operation of such single-module communication devices, specialized additional equipment is typically required. For example, a wired headset is often available for known communication devices that typically connects to the communication device through an electrical jack or plug. Another common hands-free accessory available for cellular telephones is a docking cradle, which is typically intending for mounting the communication device in a vehicle.

SUMMARY

A wireless communication device has a docking cavity, a short-range transceiver, and a long-range transceiver for long-range wireless communication with a wireless network. A wireless communication module includes a speaker and a microphone, and a short-range transceiver for short-range wireless communication with the device's short-range transceiver. The module is configured to operate in first and second modes. In the first mode, the module is separated from the communication device. In the second mode, the module is mounted in the cavity. In both modes, communication between a user and the network is conducted through the module's microphone and speaker, both short-range transceivers and the long-range transceiver.

The following features are preferable: The module is configured to be, in the first mode, removably mounted to the user's head and, further, recharged by the device. The module is further configured to operate in a third mode in which the module is mounted in the cavity and is inoperative for conducting communication between the user and the device. The device includes a microphone and a speaker for audio communication with the user and further includes a cover configured to cover the cavity when the module is in its second configuration. The device is a handheld device. The device is a first device, and a second wireless communication device is configured for short-range wireless communication with the module's short-range transceiver.

BRIEF DESCRIPTION OF THE DRAWINGS

FIG. 12 shows a movable door that is molded or otherwise worked to bear an emblem, a logo, a user identifier or the like.

DETAILED DESCRIPTION

Figure 1:
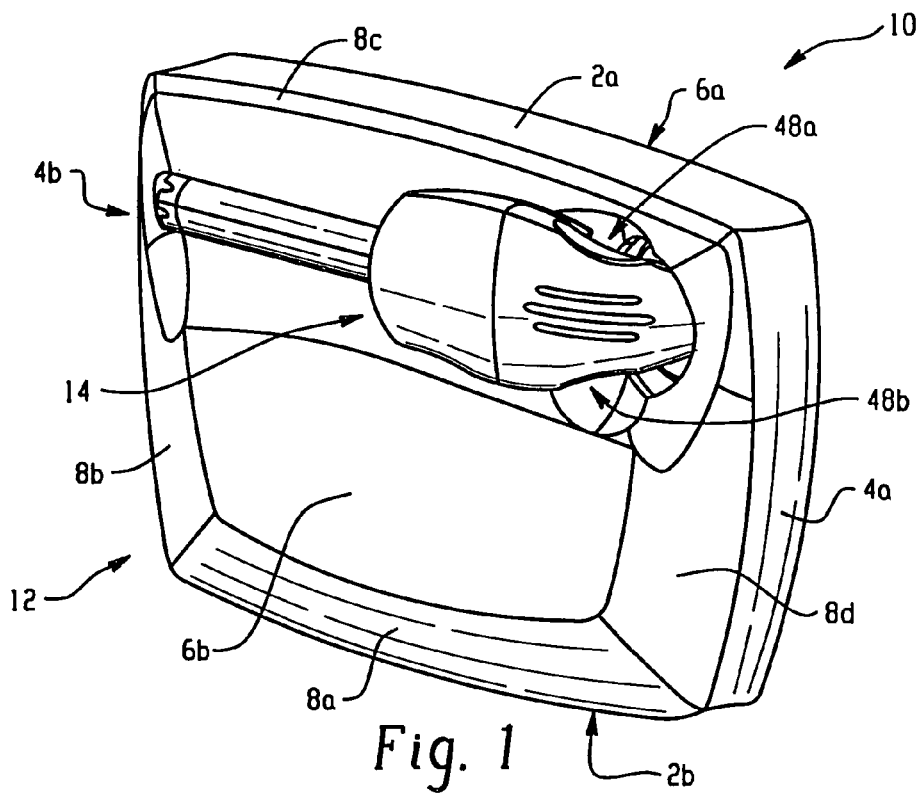
FIG. 1 is a bottom perspective view of an exemplary communication device having a first communication module and a second detachable communication module for insertion into the communication device user's ear.

Referring now to the drawing figures, FIG. 1 is a bottom perspective view of an exemplary communication device 10 having a first communication module 12 and a second detachable communication module 14 for insertion into the communication device user's ear. The first communication module 12 includes a housing with substantially parallel and planar opposite top and bottom walls 2a and 2b, substantially parallel and planar opposite side walls 4a and 4b, and substantially parallel and planar opposite front and back walls 6a and 6b. The back wall 6b preferably includes bevelled surfaces 8a-8d located along the edges where the back wall 6b adjoins the top, bottom and side walls 2a, 2b, 4a and 4b, but may also be planar, joining the top, bottom and side walls 2a, 2b, 4a and 4b at substantially right angles. The top wall 2a, bottom wall 2b and side walls 4a and 4b are preferably slightly curved, but may also be planar. The specific shapes of the housing walls are dependent upon the requirements of the first communication module 12, as will become apparent from the following description.

Figure 2:
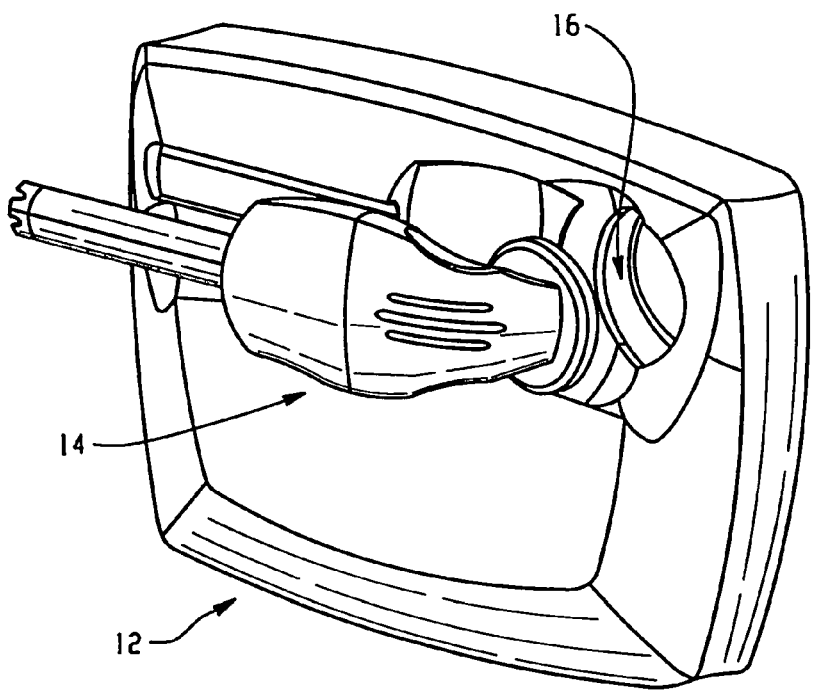
FIG. 2 is another bottom perspective view of the exemplary communication device shown in FIG. 1, in which the second communication module has been removed from the first communication module.

FIG. 2 is another bottom perspective view of the exemplary communication device 10 shown in FIG. 1, in which the second communication module 14 has been removed from the first communication module 12. The housing of the first communication module 12 preferably includes a cavity 16 in which the second communication module may be detachably mounted.

Figure 3:
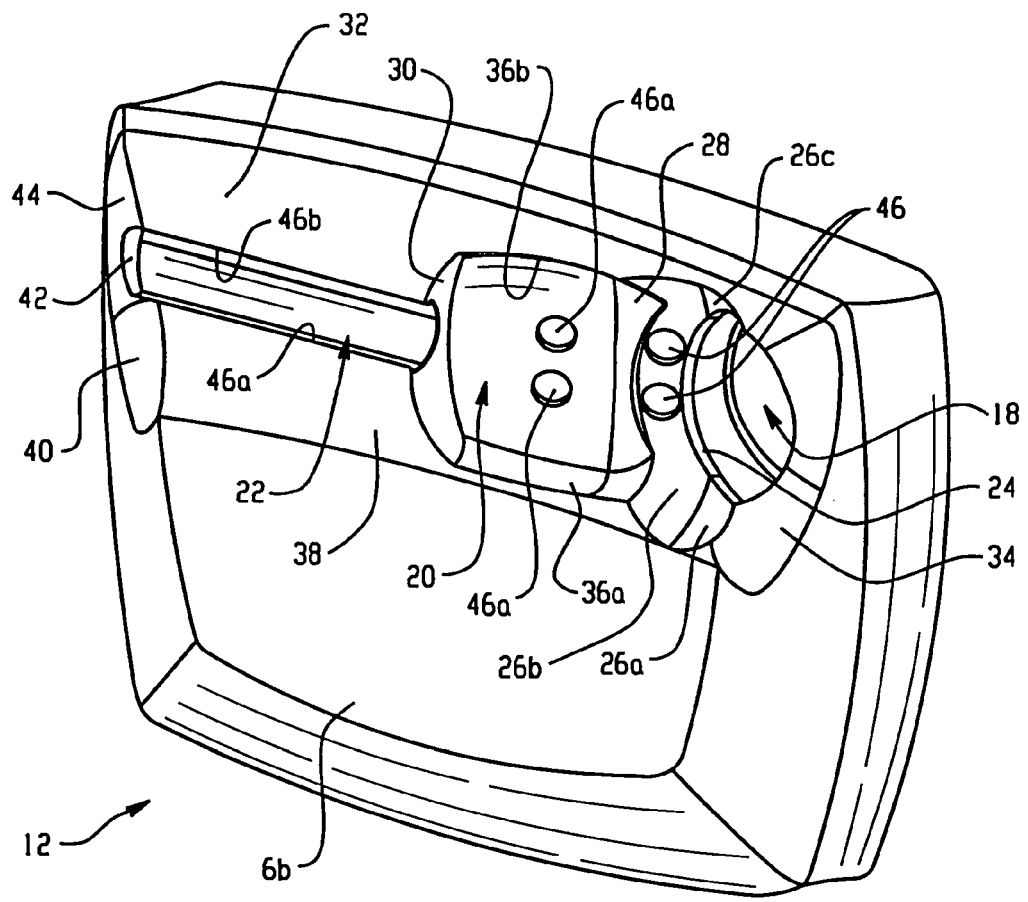
FIG. 3 provides a more detailed view of the cavity in the housing of the first communication module.

FIG. 3 provides a more detailed view of the cavity 16 in the housing of the first communication module 12. The cavity 16 preferably includes a plurality of subcavities that are shaped to accommodate the second communication module 12, each of which may be a different size, shape and depth. For instance, the exemplary cavity shown in FIG. 3 includes three subcavities: a substantially circular subcavity 18 having a first depth, a first rectangular cavity 20 having a second depth, and a second rectangular cavity 22 having a third depth. The cavity 16 also preferably includes a plurality of surfaces 24, 26b, 28 and 30 that provide smooth transitions between the subcavities 18, 20 and 22, and a plurality of surfaces 26a, 26c, 32, 34, 36a, 36b, 38, 40, 42, 44, 46a and 46b that are preferably contoured and sized primarily to produce a desired physical appearance when the second communication module 14 is mounted as in FIG. 1.

The surfaces of the cavity 16 preferably also provide for retention of the second communication module 14 within the cavity 16. Surfaces 36a and 36b and/or surfaces 46a and 46b may, for example, be contoured to engage the sides of the second communication module 14 in order to frictionally hold it within the cavity 16. In another embodiment, surfaces in or adjacent to the cavity 16 may include retention means, such as nubs or protrusions, that engage detents in corresponding parts of the second communication module 14, or vice versa, to detachably hold the second communication module 14 within the cavity 16. In yet another embodiment, other retention means, such as springs or otherwise elastically-biased protrusions or hooks, may be included on the first or second communication module that cooperate with appropriate mating retention means on the other of the first or second communication module. Alternatively, additional means to maintain the device in an assembled position, such as a movable clip arrangement, could be mounted on the first communication module 12.

In order to remove the second communication module 14 from the cavity 16, the surfaces 26a, 26b and 26c are preferably contoured to provide spaces 48a and 48b (shown in FIG. 1) that enable a communication device user to grasp the sides of the second communication module 14. In addition, the second communication module 14 preferably includes depressions 50 and 52 (shown in FIGS. 4 and 5) that enable the communication device user to easily grip the module 14 while it is within the cavity 16. Preferably, the retention means described above are adapted to apply sufficient force to retain the second communication module 14 in a mounted position, while allowing a communication device user to easily remove the second communication module 14 for use.

Figure 4:
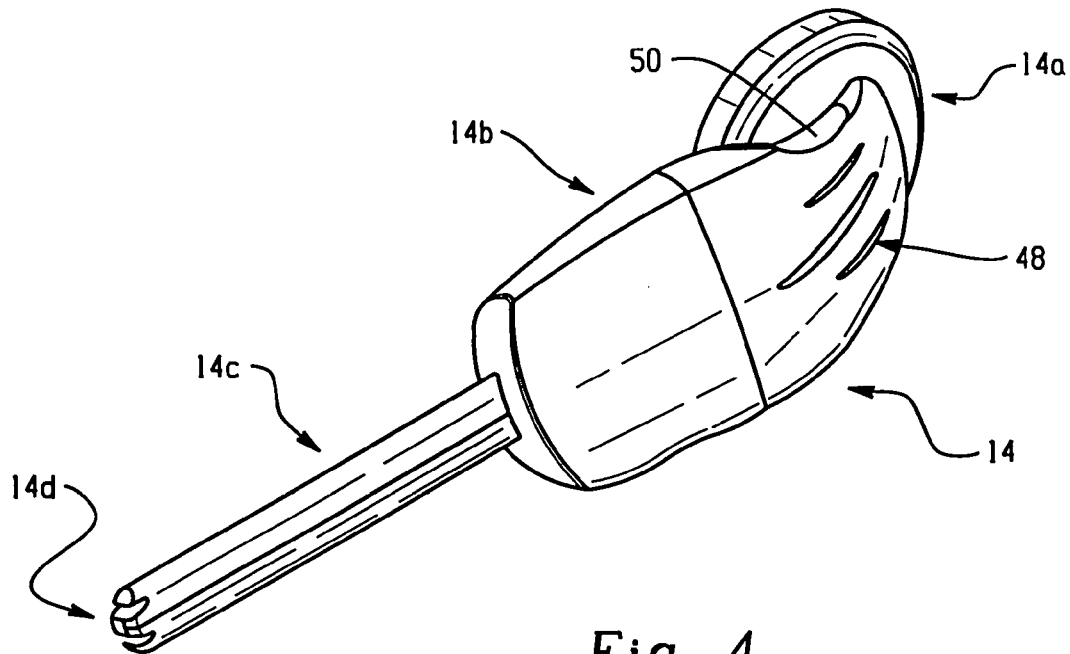
FIG. 4 is a top perspective view of the second communication module shown in FIGS. 1 and 2.

FIG. 4 is a top perspective view of the second communication module 14 shown in FIGS. 1 and 2. The second communication module 14 is preferably a voice communication device that includes a speaker 14a, a main body 14b, a boom 14c and a microphone 14d. Operationally, the speaker 14a is placed in the ear of a communication device user with the boom 14c extending towards the user's mouth. To avoid rotational movement of the second communication module 14 while the speaker 14a is in the user's ear, the center of gravity of the module 14 should preferably be as close to the speaker 14a as possible. Thus, any relatively heavy components located inside the main body portion 14b should preferably be located adjacent the speaker 14a. In this manner, moments about the speaker are minimized, and the second communication module 14 should remain substantially stationary while the speaker is in the communication device user's ear.

Optimally, the length of the boom portion 14c should be maximized such that the microphone 14d is located in the proximity of the communication device user's mouth when the module 14 is in use. The moment about the speaker 14a, however, increases in proportion to the length of the boom 14c. Thus, in order to maintain stability, the length of the boom 14c may not be sufficient to position the microphone 14d adjacent to a user's mouth. The microphone 14d will, therefore, likely receive not only a user's speech, but also undesired noise signals from a multitude of sources, such as other speakers in the vicinity or car engine noise. In order to reduce this background noise, the second communication module preferably includes a noise cancellation circuit with a background noise microphone 48 as shown in FIG. 4. The background noise microphone 48 preferably detects background noise signals which are then subtracted from the corrupted speech received by the microphone 14d in the noise cancellation circuit. In this manner, a higher quality speech signal is provided.

Figure 5:
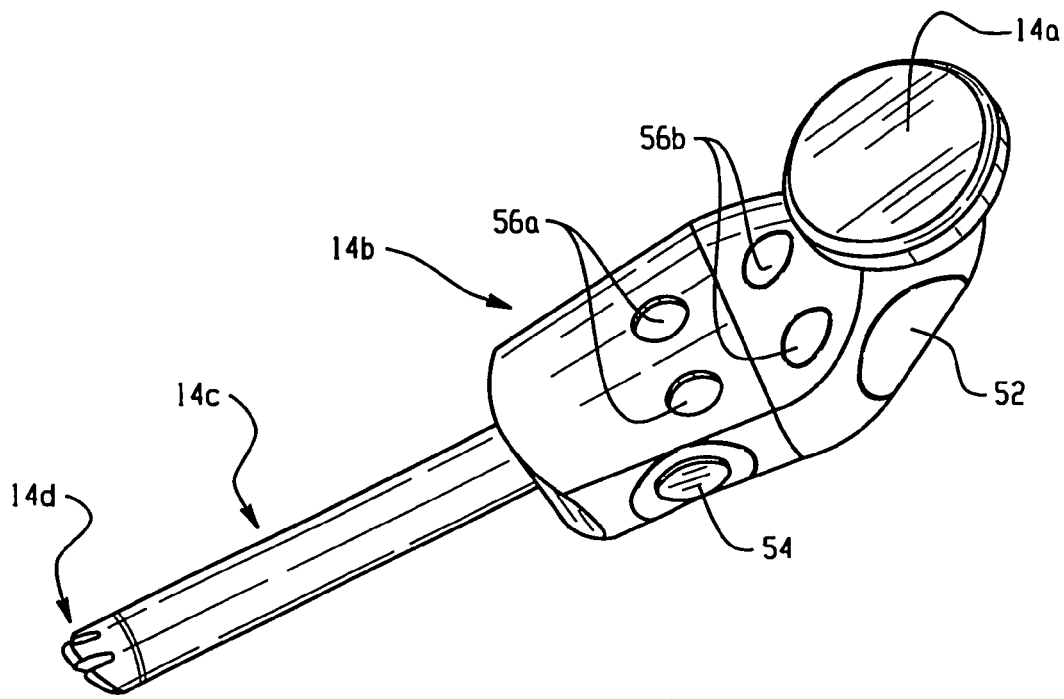
FIG. 5 is a bottom perspective view of the second communication module that shows additional exemplary features, including a power switch and charging terminals.

FIG. 5 is a bottom perspective view of the second communication module 14 that shows additional exemplary features, including a power switch 54 and charging terminals 56. The power switch 54 is preferably a pushbutton switch that turns the second communication module 14 on and off, enabling the communication device user to limit power consumption while the module 14 is not in use. In a preferred embodiment, the second communication module 14 is also configured to turn on automatically when removed from its assembled position within the first communication module 12, and to turn off automatically when replaced in its mounted position. In this preferred embodiment, the power switch 54 may be used to turn off the second communication module 13 without returning it to its mounted position. In other embodiments, the second communication module 14 may also include other switched functions, such as a mute function, controlled by one or more additional switches located on the first and/or second module. For example, a mute function may operate to disable the microphone 14d and the background noise microphone 48 without ending a communication function such as a voice call.

The charging terminals 56 on the second communication module 14 preferably mate with corresponding charging terminals 46 on the first communication module 12 shown in FIG. 3. Also shown in FIGS. 3 and 5 are alternative locations 46a and 56a for the respective charging terminals. The second communication module 14 preferably includes a rechargeable power source that is recharged by the first communication module 12 through the charging terminals 46 and 56 while the second communication module is in its fully mounted position as shown in FIG. 1. The charging terminals 46 on the first communication module 12 are preferably coupled to an internal power source through appropriate conversion and control circuitry in order to provide a charge to an additional power source in the second communication module.

In addition, the charging terminals 46 and 56 preferably include appropriate structures or arrangements to prevent discharging of the respective power sources or damage to internal components caused by external contact with the terminals. For example, the charging terminals 56 may be recessed below the surface of the main body 14b of the second communication module 14 in order to reduce the likelihood of external contact with the charging terminals 56, resulting in a short-circuit. In such an embodiment, the charging terminals 46 on the first communication module 12 may protrude from the surface 26b in order to make contact with recessed charging terminals 56 in the second communication module 14.

With reference to FIG. 3, the first communication module 12 may include either a non-rechargeable power source such as one or more alkaline batteries, or a rechargeable source. In devices where the first communication module 12 includes a rechargeable power supply, the power supply is preferably recharged through an operative connection to a recharging device, such as a cradle or holding unit. The device 10 could also be adapted to receive a connector jack or plug from a more common wall-mounted type charger device.

Figure 6:
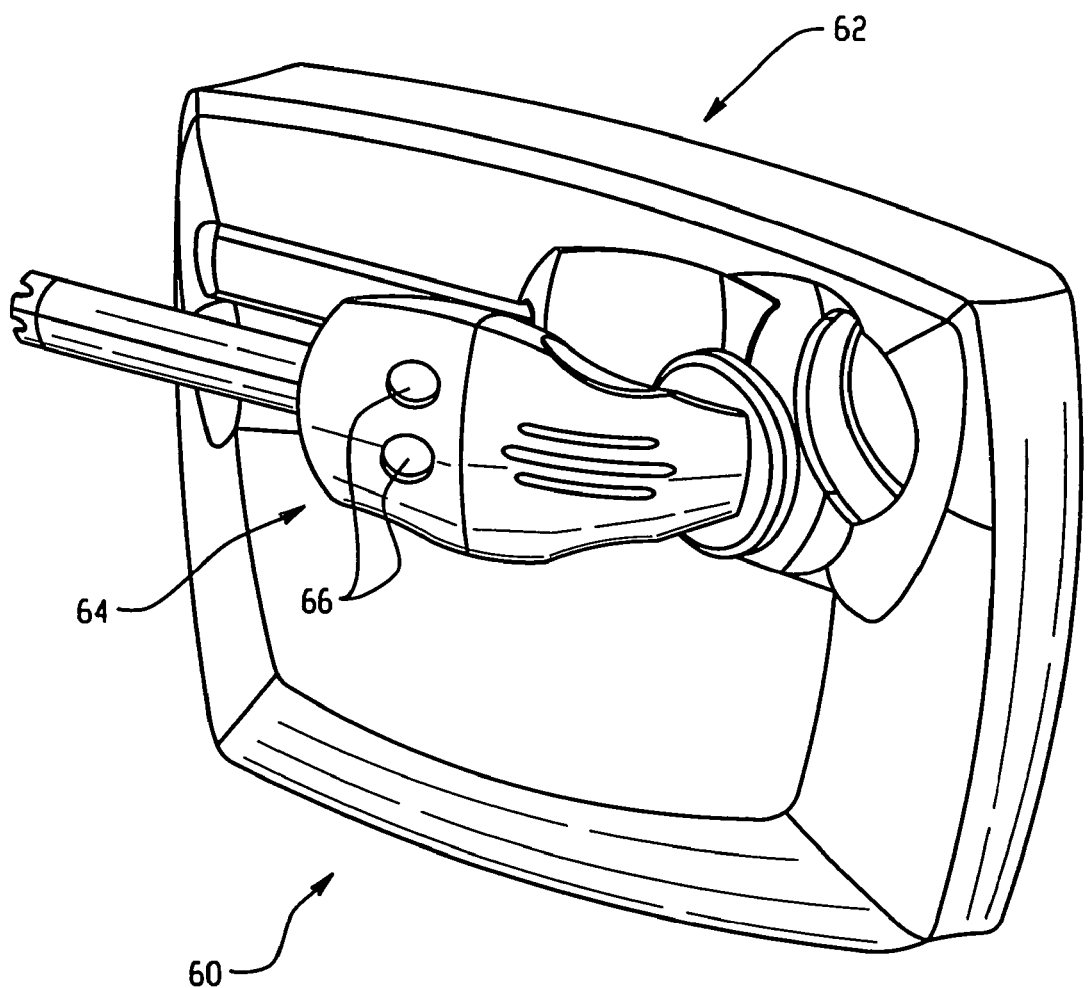
FIG. 6 is a bottom perspective view of the communication device showing operative-mode connection terminals on the second communication module.
Figure 7:
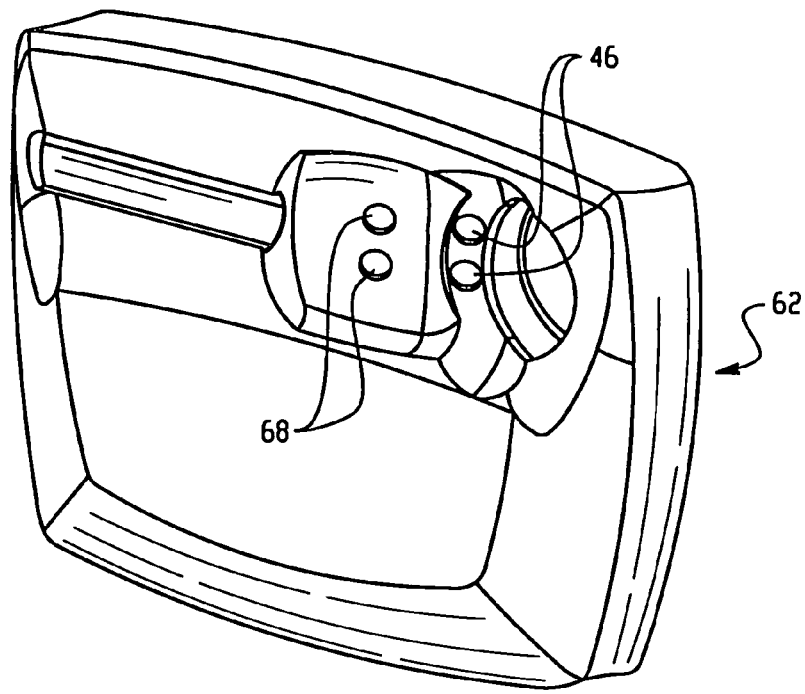
FIG. 7 is a bottom perspective view of the first communication module showing both operative-mode connection terminals and inoperative-mode connection terminals.
Figure 8:
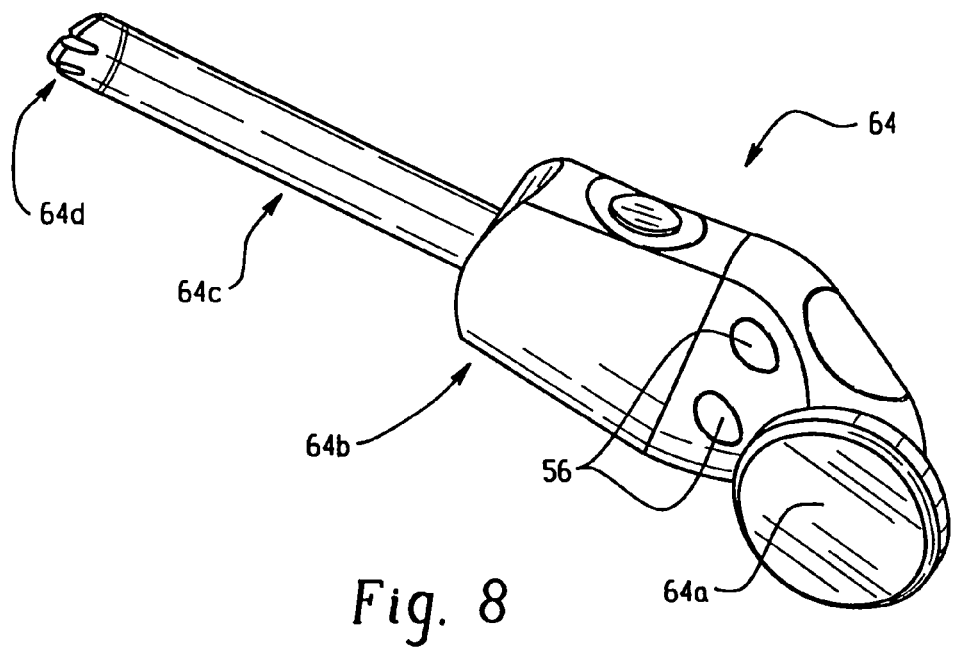
FIG. 8 is a bottom perspective view of the second communication module showing inoperative-mode connection terminals.

With reference again to FIG. 5, the second communication module 14 preferably includes a rechargeable power source that is charged through the recharging terminals 46 and 56 described above. It should be understood, however, that the second communication module 14 may alternatively include a single use power source, such as a non-rechargeable battery, making charging terminals 46 and 56 unnecessary FIGS. 6-8 show an alternative communication device 60 embodiment in which a second communication module 64 may be mounted to a first communication module 62 in either an operative or inoperative position. FIG. 6 is a bottom perspective view of the communication device 60 showing operative-mode connection terminals 66 on the second communication module 64. FIG. 7 is a bottom perspective view of the first communication module 62 showing both operative-mode connection terminals 68 and inoperative-mode connection terminals 46. FIG. 8 is a bottom perspective view of the second communication module 64 showing inoperative-mode connection terminals 56.

When the second communication module 64 is mounted in an inoperative assembled position, the inoperative-mode terminals 46 in the first communication module 62 are electrically connected with the inoperative-mode terminals 56 on a front wall 64b of the second communication module 64, as shown in FIG. 8. In the inoperative assembled position, the inoperative-mode terminals 46 and 56 preferably operate as described above to charge a power source in the second communication module 64.

When the second communication module 64 is mounted in an operative assembled position, the operative-mode connection terminals 68 in the cavity of the first communication module 62, shown in FIG. 7, are electrically connected with the operative-mode connection terminals 66 on a back wall of a main body portion of the second communication module 64 shown in FIG. 6. In this operative assembled position, the speaker 64a and microphone 64d, shown in FIG. 8 face away from the cavity and are accessible for use by a user of the communication device. In addition, the operative-mode terminals 66 and 68 provide for simultaneous charging and use of the second communication module 64. For instance, the operative-mode terminals 66 and 68 may provide for operation of the second communication module 64 from the power source of the first communication module 62, while simultaneously charging the power source of the second communication module 64. The operative assembled position of the second communication module 64 thus provides for use of the second communication module 64 when its power source is incapable of supplying sufficient power, and thereby avoids recharge down time.

Any of the retaining means discussed above could be used to mount the second module 64 in the operative position. For example, a friction fit between the main body 64b of the second communication module 64 and the corresponding cavity in the first communication module 62 will preferably retain the second module 64 in its assembled inoperative position. The main body 64b, or at least a part thereof, could then be fabricated such that the back portion, in which terminals 66 are positioned, and the front portion are substantially symmetric. The second communication module 64 may then be retained in either its operative or inoperative assembled position within the cavity in the first communication module 62. A similar arrangement could alternatively be implemented based on friction fit retention of the boom portion 64c of the second communication module 64.

Figure 9:
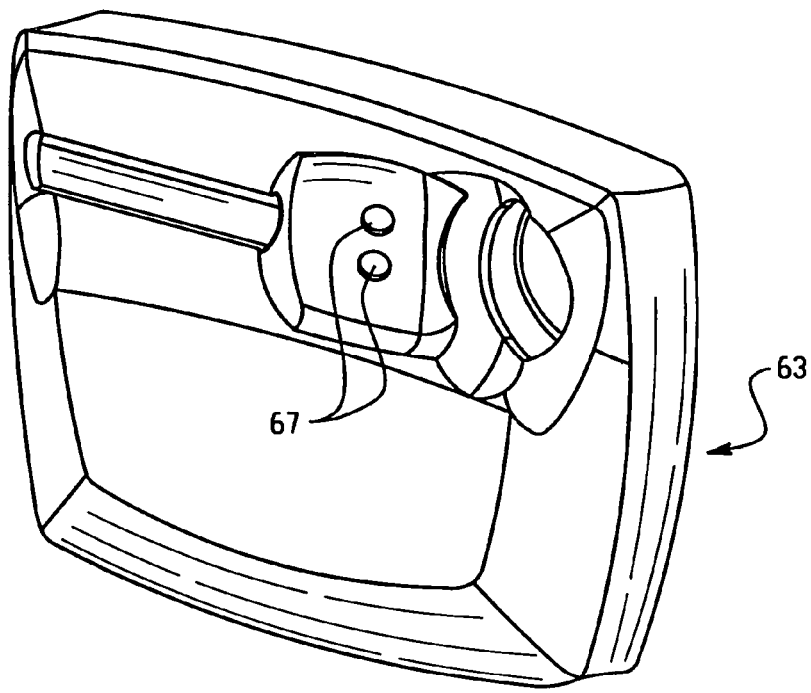
FIG. 9 is a bottom perspective view of the first communication module showing the multifunctional connection terminals.
Figure 10:
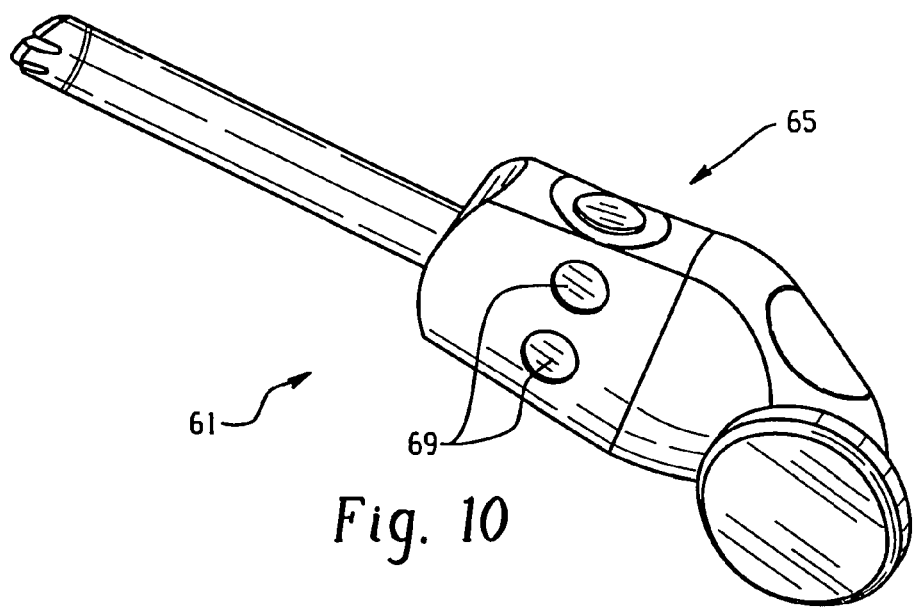
FIG. 10 is a bottom perspective view of the second communication module showing a set of charging terminals.

FIGS. 9 and 10 show another embodiment 61 of a communication device in which a second communication module 65 may be mounted to a first communication module 63 in either an operative or inoperative position, and the first communication module 63 utilizes only one set of multifunctional connection terminals 67. FIG. 9 is a bottom perspective view of the first communication module 63 showing the multifunctional connection terminals 67. FIG. 10 is a bottom perspective view of the second communication module showing a set of charging terminals 69. One function of the connection terminals 67 on the first communication module 63 may be to cooperate with the charging terminals 69 positioned on the second communication module 65 in order to supply power to a rechargeable power source in the second communication module 65 while it is mounted in the inoperative position. In addition, the multifunctional connection terminals 67 may also contact a second set of terminals on the top face of the second communication module 65 (as shown in FIG. 6) when the second communication module 65 is mounted in its operative assembled position. The multifunctional connection terminals 67 may then provide for simultaneous charging and use of the second communication module 65 while it is mounted in its operative position.

Figure 11:
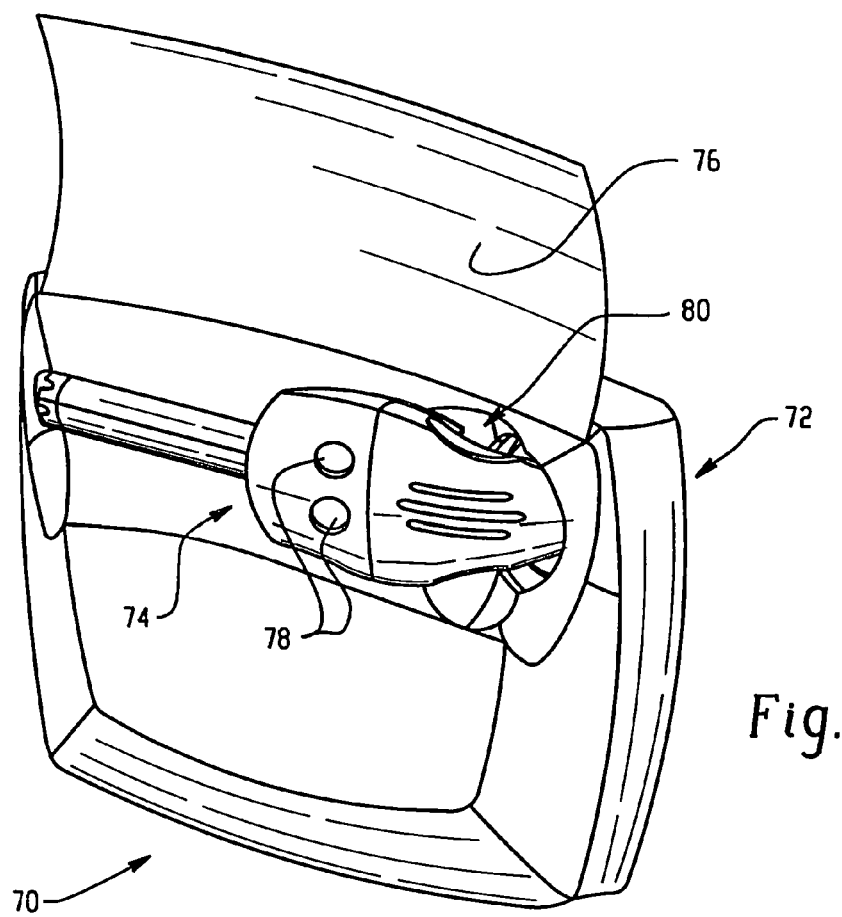
FIG. 11 is a bottom perspective view of an exemplary communication device having a first and second communication module, in which the first communication module includes a protective movable door.

FIG. 11 is a bottom perspective view of an exemplary communication device 70 having a first and second communication module 72 and 74, in which the first communication module includes a protective movable door 76. The protective movable door 76 is preferably fabricated from the same or similar material as the housing of the first communication module 72, and is positioned on a surface adjacent the cavity in which the second communication module 74 is mounted in its inoperative assembled position. The door 76 is normally in a closed position protecting the second communication module 74 and connection terminals 78 (if present), and is movable to allow detachment of the second communication module 74 from the first communication module 72. Then, when the second communication module 74 is detached from the first communication module 72, the door 76 may be moved to its closed position to substantially cover the cavity 80 in the first communication module 72.

The door 76 may be attached to the first communication module 72 through any appropriate hinge arrangement, and is preferably biased toward its open and closed positions. For instance, if an over-center spring or elastic biasing hinge arrangement is utilized, the door 76 is preferably biased toward its open position when the door 76 is opened beyond some point in its range of motion, and is otherwise biased toward its closed position. In addition, the door 76 may also include a fastening means or locking mechanism for maintaining the door in its closed position. Other specific ranges of motion are also contemplated in accordance with this aspect of the invention, including but not limited to a downwardly or sideways swinging door or a similar sliding door or covering panel.

Figure 12:
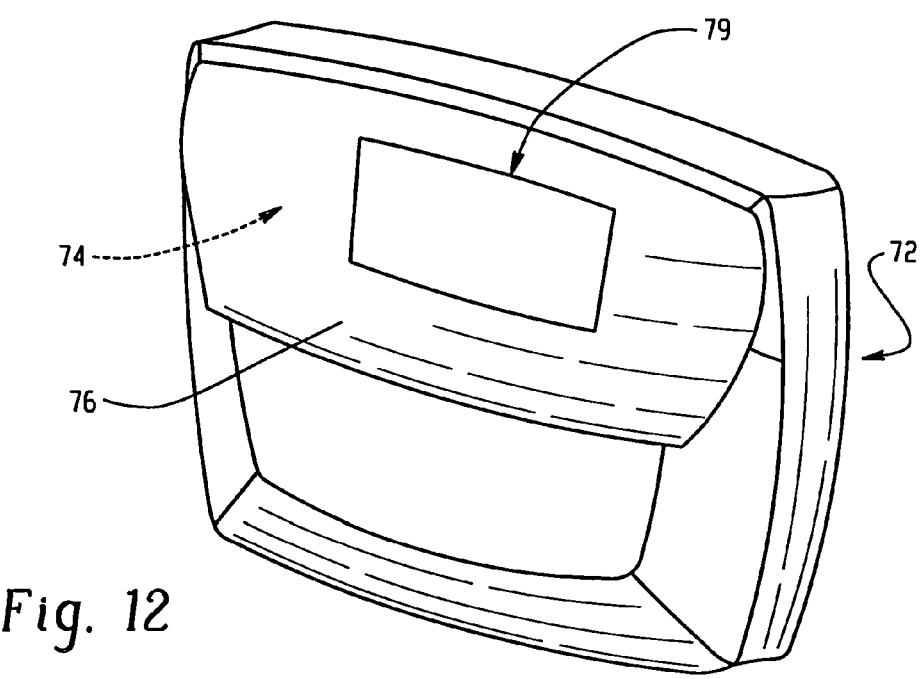

Although intended primarily for protecting the second module 74 when it is mounted on the first module 72, the door 76 may also serve a decorative purpose. If fabricated from the same material as the housing of the first module 72, which is typically opaque, the door may, for example, be molded or otherwise worked to bear an emblem, a logo, a user identifier or the like, as shown at 79 in FIG. 12. Alternatively, the door 76 may be fabricated from a transparent material and adapted to receive a decorative member such as a photograph, allowing a user to customize the appearance of the communication device according to personal taste and preference.

Figure 13:
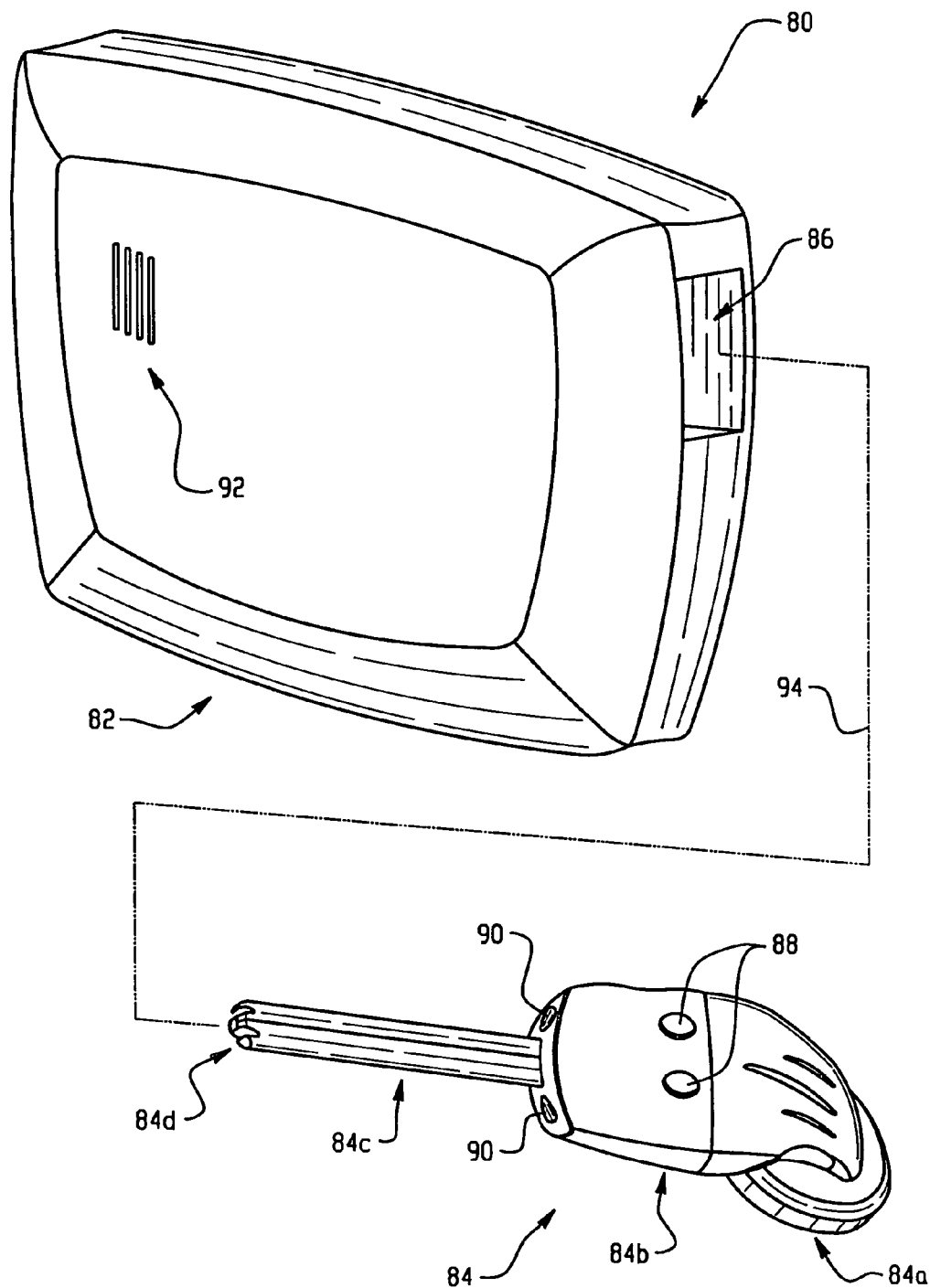
FIG. 13 shows another exemplary communication device in which a first communication module includes a substantially enclosed cavity into which a second communication module is mounted.

FIG. 13 shows another exemplary communication device 80 in which a first communication module 82 includes a substantially enclosed cavity 86 into which a second communication module 84 is mounted. Preferably, the second communication module 84 is mounted by sliding it into the cavity 86 in a direction indicated by the dotted line 94. The first communication module 82 and second communication module 84 preferably include suitable retaining means for removably holding the second communication module 84 within the cavity 86.

The communication modules 82 and 84 may be adapted for operation in accordance with any of the embodiments described above. For instance, if the device 80 provides for an operative assembled position of the second communication module 13, then an opening 92, preferably comprising a series of slits as shown in FIG. 13, may be provided at an appropriate position in a wall of the housing of first communication module 82. Preferably, the slits are positioned to correspond to the position of a microphone 84d when the second communication module 84 is in its operative assembled position. Depending on the particular operative assembled position of the second communication module 84, a further opening similar to opening 92 could be provided for a speaker 84a. Alternatively, the operative assembled position could be designed such that the speaker 84a remains outside the cavity 86.

In addition, a set of contact terminals 88 on the second communication module 84 may cooperate with suitably located terminals inside cavity 86 to provide for recharging of a power source in the second module 84 and/or powering the second module 84 from the power source in the first module 82. In an alternative embodiment, a set of female terminals 90 may be located at a bottom edge of the main body 84b of the second communication module 84 that engage and electrically connect to corresponding male terminals inside the cavity 86.

Figure 14A:
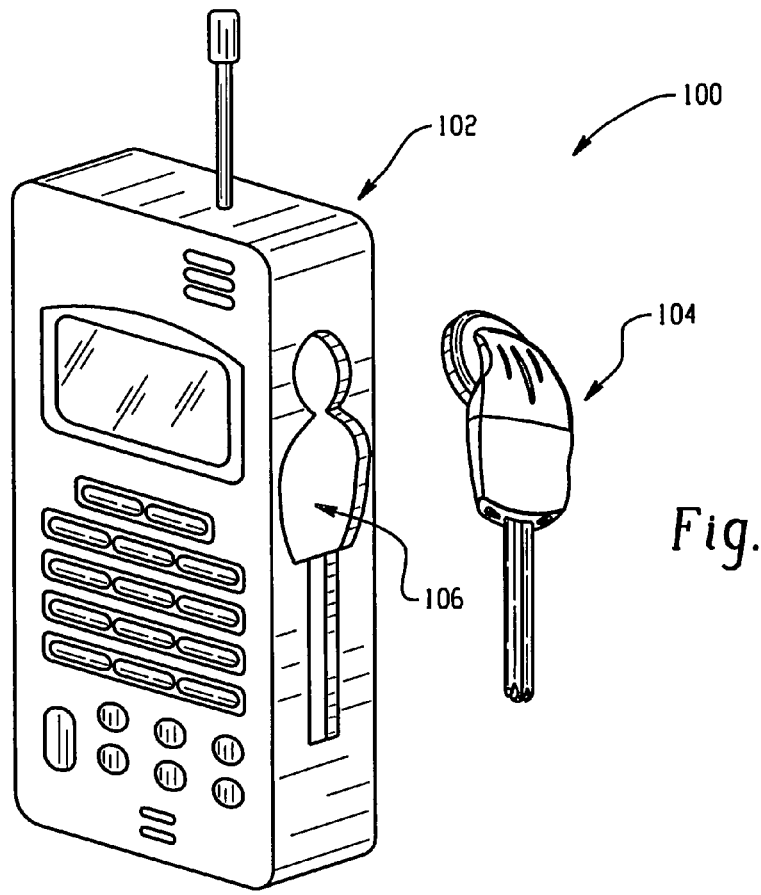
FIGS. 14a and 14b respectively show exemplary embodiments in which the first communication module is a cellular telephone and a laptop computer or PDA.
Figure 14B:
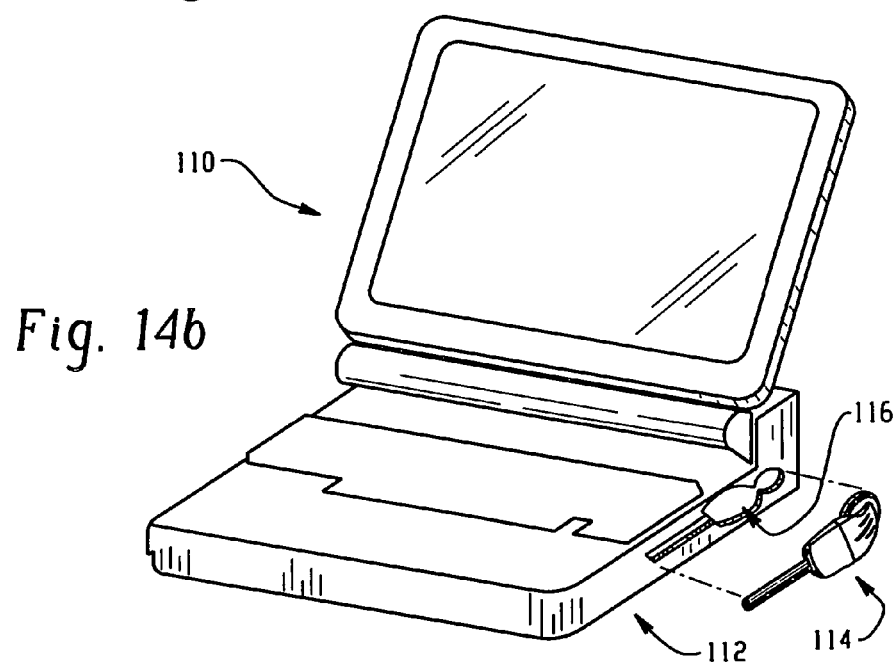

Each of the above exemplary embodiments include a general first communication module. This first communication module may, for example be a handheld electronic device as disclosed in U.S. patent application Ser. No. 09/106,585, which is hereby incorporated into the present application by reference. It should be understood, however, that the first communication module is not limited to such a handheld electronic device. For instance, FIGS. 14a and 14b respectively show exemplary embodiments 100 and 110 in which the first communication module is a cellular telephone 102 and a laptop computer or PDA 112. In FIG. 14a, a second communication module 104 is removably assembled in a cavity 106 in the cellular telephone 102. Similarly, the laptop computer or PDA 112 shown in FIG. 14b includes a mounting location 116 in which a second communication module 114 may be attached. Any of the above terminal and mounting arrangements, including, for example, a protective door or an enclosed cavity in which the second communication modules 104 or 114 would be slidably mounted, are also contemplated for the devices 100 and 110.

Figure 15A:
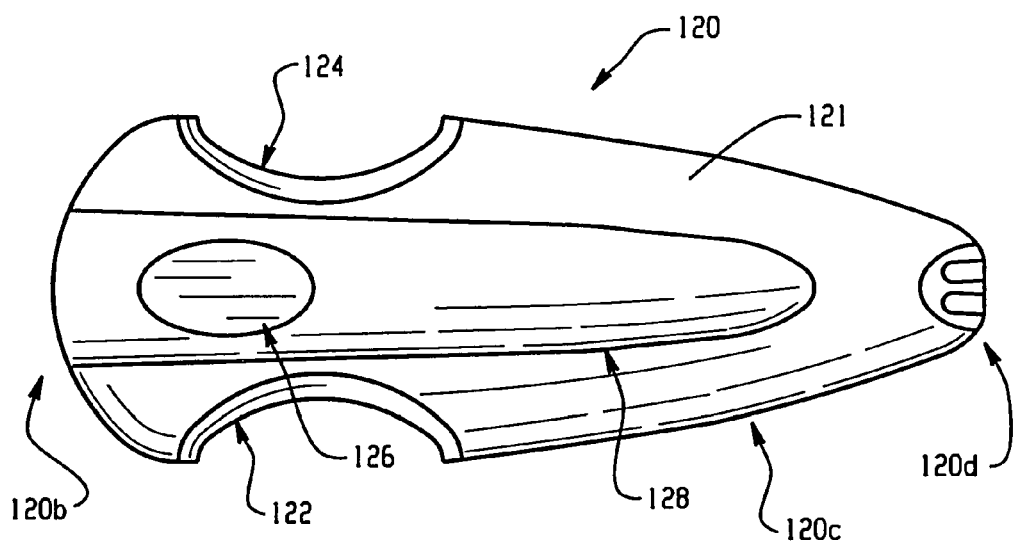
FIG. 15a shows a top perspective view of an alternative second communication module.
Figure 15B:
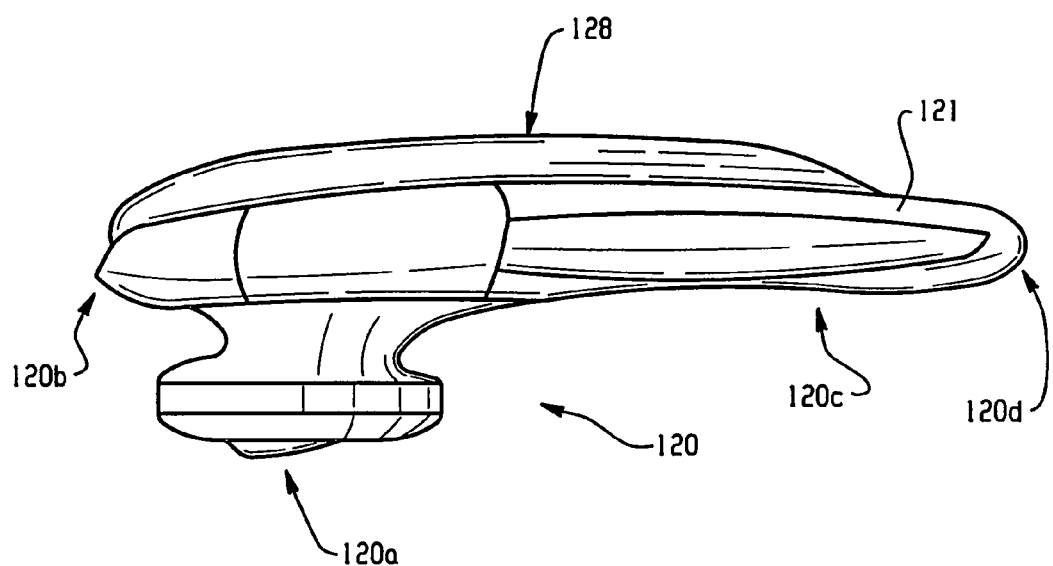
FIG. 15b shows a side perspective view of the alternative second communication module.

FIGS. 15a and 15b show one alternative design 120 for the second communication module. FIG. 15a shows a top perspective view of the alternative second communication module 120. FIG. 15b shows a side perspective view of the alternative second communication module 120. The alternative communication module 120 preferably includes a housing 128, a speaker 120a, a microphone 120d and a switch 126. The housing 121 preferably includes a substantially oval-shaped top profile, and indentations 122 and 124 that define handles by which a user may grasp and hold the second communication module 120. In addition, the housing 121 preferably has a main body portion with two sections: an upper section 120b that lies substantially to one side of the speaker 120a; and a lower section 120c that lies substantially on the opposite side of the speaker 120a. The microphone 120d is preferably located at a distal end of the lower section 120c. The switch 126 is preferably located on a top portion of the housing 121 and operates similarly to the switch 54 shown in FIG. 5. The module may also include an additional microphone adapted to receive background noise for use in executing noise cancellation operations for the desired but corrupted voice or audio signals received at microphone 120d.

Like the second communication modules described above, the alternative module 120 communicates via a wireless link with an associated first communication module and is designed to provide for hands-free operation. The speaker 120a is placed in a user's ear such that body section 120c and thus microphone 120d extend toward the user's mouth. Extension of the upper and lower main body sections 120b and 120c on opposite sides of the speaker 120a allows for effective weight balancing. A further feature of the alternative second communication module 120 involves a raised portion 128 that overlies the upper and lower main body sections 120b and 120c. The raised portion 128 is preferably a removable cover member that provides simple access to manufacturer-selected internal components, such as a single-use replaceable battery, for service or installation by a user.

Figure 16:
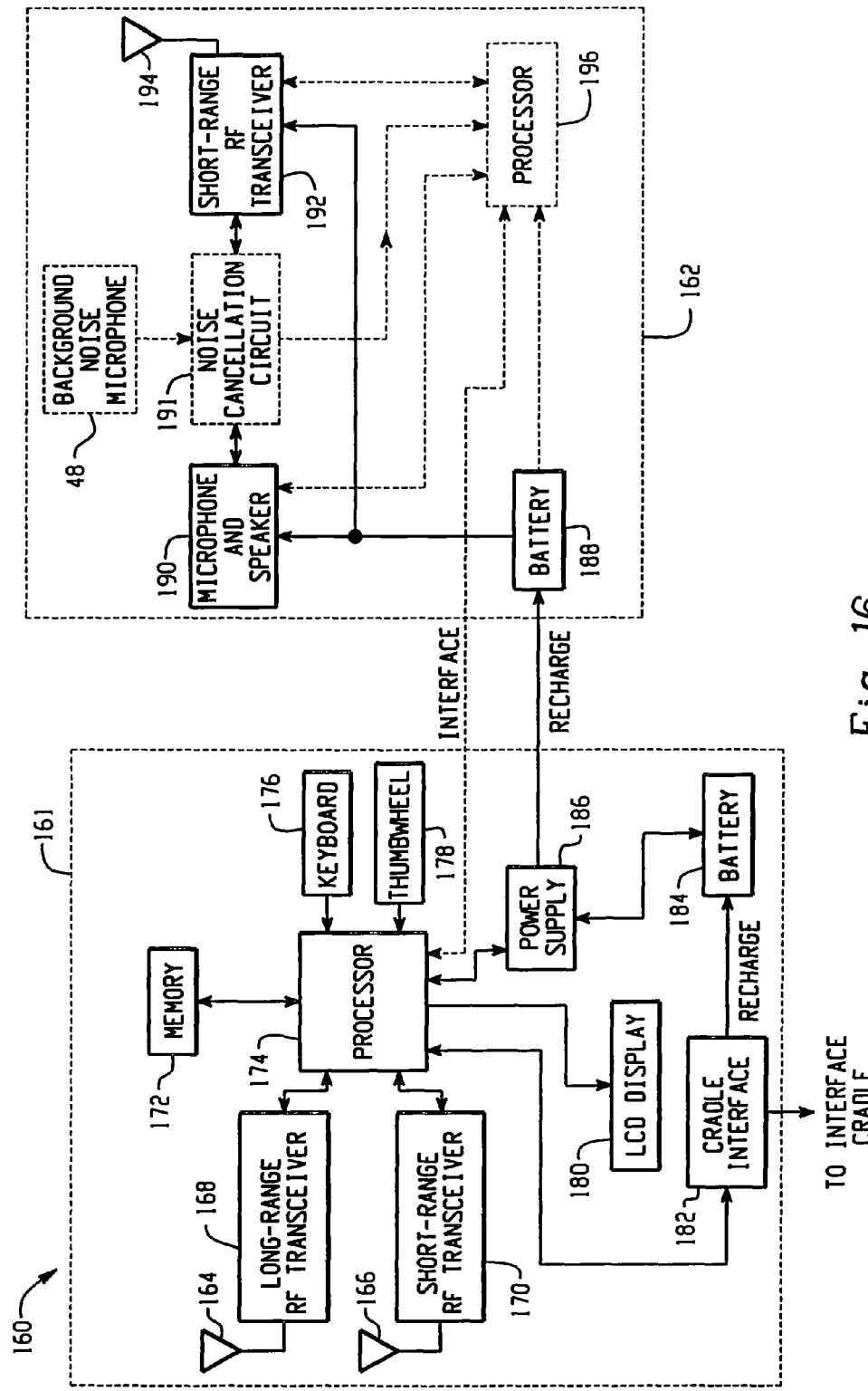
FIG. 16 is an exemplary electrical block diagram of the multi-module communication devices shown in FIGS. 1-15.

FIG. 16 is an exemplary electrical block diagram 160 of the multi-module communication devices shown in FIGS. 1-15. Another type of communication device that could be modified for use with this system is described in co-pending U.S. patent application Ser. Nos. 09/106,585, 09/344,432, 09/543,231, 09/634,774 and 09/663,972. These applications, which are co-owned with the present application, are hereby incorporated herein by reference. The communication devices described in these applications include only a single wireless RF component for communicating over a single communication path to a long-range wireless network. The devices shown in FIGS. 1-15 are similar to these devices in that they can communicate over a long-range wireless network, but also preferably include an RF interface for communicating over a short-range wireless network or link.

The communication devices 160 shown in FIGS. 1-15 preferably comprise a first communication module 161 and a second communication module 162. The first communication module 161 preferably includes a pair of antennas 164, 166 (although a single antenna structure could be used), a processor 174, a memory 172, an LCD display 180, at least one rechargeable battery 184, a long-range RF transceiver 168, one or more short-range RF transceivers 170, a power supply and recharging circuit 186, a cradle interface circuit 182, and one or more input devices, including, preferably, a keyboard 176 such as described in the above mentioned co-pending applications and a thumbwheel 178. The first communication module 161 may also include a pressure-sensitive writing tablet.

The input devices 176, 178 on the first communication module 161 are preferably used to respond to and generate messages, such as email messages. The first communication module 161 preferably interfaces with a belt-worn holster for receiving the first communication module 161 and securing it to a user's belt. The long-range RF transceiver 168 is used to send and receive information from the long-range wireless network, and the one or more short-range RF transceivers 170 are used to send and receive information from the second communication module 162, and possibly from other local devices such as an RF interface cradle.

The second communication module 162 is preferably an RF-enabled ear-piece that may be connected to (both mechanically and electrically) the first communication module 161 as described above. The second communication module 162 preferably includes a microphone and a speaker 190, a short-range wireless transceiver 192, an antenna 194, a rechargeable battery 188, and possibly an integral processor 196. The second communication module 162 may also include a background noise microphone 48 and a noise cancellation circuit 191 as described above with reference to FIG. 4. When the second communication module 162 is placed into the first communication module 161, a shared secret can be exchanged between the two wireless components of the communication device 160 so that any communications between the first and second communication modules 161/162 may be encrypted. Also, the rechargeable battery 188 of the second module 162 may be recharged by the battery 184 of the first communication module 161 through power supply recharging circuitry 186 when the two modules are in electrical contact.

In other embodiments, the communication device 160 may include a camera component for displaying or sending video images to the communication device user, or could include sensory circuits for monitoring the communication device user's vital information such as pulse and blood pressure. In these embodiments a nurse or doctor in a hospital floor could wear the first component, while the second might be in a patient's room monitoring some vital statistics. The short-range communication in this example might reach several hundred feet and several second components might be communicating to a single first component. This information could then be relayed on from the first component worn by the nurse or doctor to a central nursing station for all nurses on duty to see and monitor.

Figure 17:
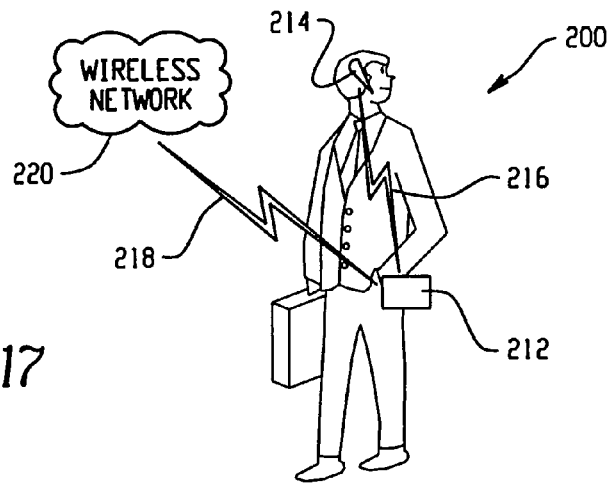
FIG. 17 illustrates one contemplated implementation of the communication device described above.

FIG. 17 illustrates one contemplated implementation 200 of the communication device described above, wherein 212 denotes the first communication module and 214 is the second communication module. In this system 200, the first communication module 212 and second communication module 214 incorporate compatible short-range communication systems. This allows wireless communications between the first and second modules 212 and 214 over a short-range RF link 216. The first communication module 212 is also designed for communication over a wireless link 218 with a long-range wireless communication network 220. In this implementation 200, the first communication module 212 is preferably a mobile communication device such as a cellular telephone, a two-way pager or communications-enabled PDA, which would normally be carried by users in or on a belt clip or holder, or in a briefcase or purse.

The second communication module 214 is preferably a relatively low cost item, such that a user of a multiple-module device could purchase and suitably configure several second communication modules 214 for use with a single first communication module 212. The different second communication modules 214 could preferably be purchased "off-the-shelf" and then configured, for example, through an over-the-air registration process executed under user control of the first communication module 212.

Figure 18:
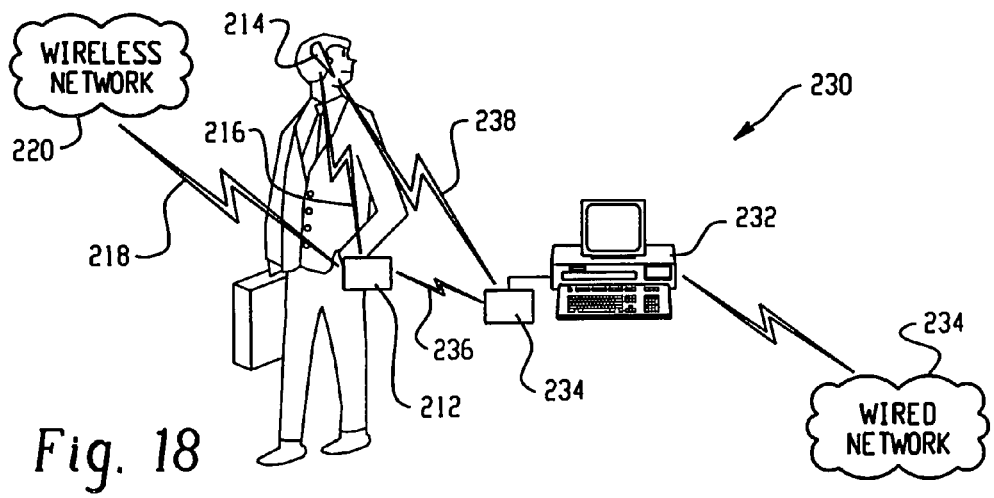
FIG. 18 illustrates a further embodiment of a communication device that includes wireless communication between the device modules and a third module, such as an RF interface cradle.
Figure 18A:
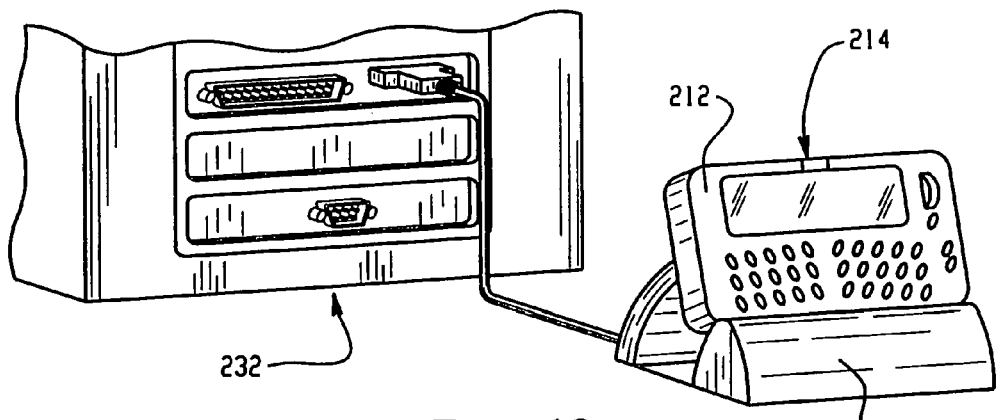
FIG. 18a is a more detailed illustration of the third module shown in FIG. 18.

The basic system 200 could be expanded in accordance with a further embodiment shown in FIG. 18 to include wireless communication between the device modules 212 and 214 and a third module 234, such as an RF interface cradle. If the first communication module 212 includes a rechargeable power source, then the third module 234 may be a docking station or cradle into or upon which the first module may be removably placed in order to recharge its power source. If the second communication module 214 is also powered by a rechargeable source, then the second module 214 may also be recharged by mounting the fully assembled multiple-module communication device on the third module 234. A more detailed illustration of the third module 234 is shown in FIG. 18a.

The third module 234 is preferably adapted for short-range communications with either the first communication module 212 over the a short range RF link 236, the second communication module 214 over another short range RF link 238, or both. Many possible uses of such the additional short range RF links 236 and 238 are possible. For instance, the third module 234 may be connected to a desktop computer 232 as shown in FIGS. 18 and 18a to expand the capabilities and potential applications of multiple module communication devices. The wireless links 236 and 238 may then be used to carry data and audio signals between the user and the computer 232, as well as any wired network 234 and associated components to which the computer is connected. Although shown as separate components in FIGS. 18 and 18a, the third module 234 could alternatively be integrated into the computer 232.

Communication between the multiple-module device 212/214 and the computer 232 provides for countless possible functionality options, such as simple paging and other notification, remote- and voice-activated computer and peripheral control and wireless file or information downloading and uploading. This system may also be further expanded to include network communications between the first and second communication modules 212 and 214 and wired network 234 through the PC 232 to incorporate connectivity via small pico-cell networks. In such an implementation, each third module 234 connected to a corporate or other local area network such as the wired network 234, could be adapted to perform pico-cell base station functions. Each such "base station" third module 232 could, for example, then be configured for short-range communication with the first and/or second communication modules 212 and 214 of all multiple-module communication devices issued to corporate employees. For communications between corporate users within the range of the pico-cell network, all device functions may then be performed without using the long-range wireless network 220, potentially generating significant cost savings. A further extension of the communication systems according to the above embodiments could be a personal area network (PAN).

Many different possibilities for inter-module communications features are also possible. For instance, if the first communication module 212 is a cellular telephone, then the second communication module 214 may provide a hands-free means for a user to answer and participate in a voice call received at the cellular telephone. If the modules were adapted for voice control, a cellular user may preferably initiate a telephone call, add a telephone number to a stored number list, cause the telephone to enter a locked mode, or control execution of other functions by the first module by simply speaking into the microphone of the second communication module 214.

If the first communication module 212 is enabled for data communication, then the second communication module 214 may expand its functionality. For instance, if the first communication module 212 is based on a data communication device, such as a two-way pager or a wireless modem in a laptop computer, then the addition of the second communication module 214 will enable voice communications in a device which was previously enabled only for data communication. A multiple-module communication device in accordance with this aspect of the invention can provide simultaneous voice and data communications. For example, a user that is participating in a voice communication using the second communication module 214 would preferably be able to simultaneously transmit data to the other parry to the call through the first communication module 212.

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

The invention claimed is:

1. A communication system comprising:
a communication module including a microphone, a speaker and a short-range transceiver;
a wireless device that includes a microphone, a speaker, a short-range transceiver for short-range wireless communication with the module's short-range transceiver, and a long-range transceiver for long-range wireless communication with a wireless network; and
a wired communication device, including a computer, configured for wired communication with a wired network, and including a short-range transceiver for short-range communication with the module's short-range transceiver;
the communication module, the wireless device and the wired communication device being configured for first, second, third, fourth and fifth modes of operation;
in the first mode of operation, communication between a user and the wireless network is conducted through the wireless device's microphone, speaker and long-range transceiver;
in the second mode of operation, the module is not mounted on the wireless device, and communication between the user and the wireless network is conducted through the module's microphone, speaker and short-range transceiver and through the wireless device's short range transceiver and long-range transceiver;
in the third mode of operation, the module is not mounted on the wireless device, and communication between the user and the wired network is conducted through the module's microphone, speaker and short-range transceiver, and through the wired communication device's short-range transceiver;
in the fourth mode of operation, the module is mounted on the wireless device in a first orientation and conducts communication through the module's speaker and microphone while being charged by the wireless device; and
in the fifth mode of operation, the module is mounted on the wireless device in a second orientation, different than the first orientation, while being charged by the wireless device and is inoperative for conducting communication, wherein the mode of operation can be automatically changed from the fourth mode to the fifth mode by changing the orientation of the module.

2. The system of claim 1 wherein the wired communication device includes a computer.

3. The system of claim 1 wherein the wireless device includes a computer.

4. The system of claim 1 wherein the wireless device is a cellular phone.

5. The system of claim 1 wherein the wireless device includes a docking cavity configured to receive the module.

6. The system of claim 1 further configured for a fourth mode of operation in which communication between the user and the wired network is conducted through short-range wireless communication between the short-range transceivers of the wireless device and the wired communication device.

7. The system of claim 6 wherein, in the fourth mode, the communication is conducted, further, through short-range wireless communication between the short-range transceivers of the module and the wireless device.

8. The system of claim 7 wherein said communication between the user and the wired network includes data communication.

9. A communication system comprising:
a communication module including a microphone, a speaker and a short-range transceiver;
a wireless device that includes a microphone, a speaker, a short-range transceiver for short-range wireless communication with the module's short-range transceiver, and a long-range transceiver for long-range wireless communication with a wireless network; and
a wired communication device configured for wired communication with a wired network, and including a short-range transceiver for short-range communication with the module's short-range transceiver;
the communication module, the wireless device and the wired communication device being configured for first, second, third, fourth and fifth modes of operation;
in the first mode of operation, communication between a user and the wireless network is conducted through the wireless device's microphone, speaker and long-range transceiver;
in the second mode of operation, the module is not mounted on the wireless device, and communication between the user and the wireless network is conducted through the module's microphone, speaker and short-range transceiver and through the wireless device's short range transceiver and long-range transceiver;
in the third mode of operation, communication between the user and the wired network is conducted through short-range wireless communication between the short-range transceivers of the wireless device and the wired communication device;

in the fourth mode of operation, the module is mounted on the wireless device in a first orientation and conducts communication through the module's speaker and microphone while being charged by the wireless device; and in the fifth mode of operation, the module is mounted on the wireless device in a second orientation, different than the first orientation, while being charged by the wireless device and is inoperative for conducting communication, such that wherein the mode of operation can be automatically changed from the fourth mode to the fifth mode by changing the orientation of the module.

10. The system of claim 9 wherein, in the third mode, said communication is conducted, further, through short-range wireless communication between the short-range transceivers of the module and the wireless device.

11. The system of claim 10 wherein, in the third mode, said communication includes data communication.

12. The system of claim 11 wherein, in the third mode, said communication includes both voice communication and data communication.

13. The system of claim 9 wherein the wired communication device includes a computer.

14. The system of claim 9 wherein the wireless communication device is a cellular phone.

15. The system of claim 9 wherein the wireless communication device includes a docking cavity configured to receive the module.

16. The system of claim 15 wherein the module is further configured to operate in a mounted operative mode in which the module is mounted in the docking cavity and conducts communication through the module's speaker, microphone and transceiver.

17. The system of claim 9 wherein the wired communication device includes charging terminals for charging the wireless device, and the wireless device is configured to be in a mounted position in which the wireless device is being charged through the wired communication device's terminals while mounted on the wired communication device.

18. The system of claim 17 wherein the wireless communication device includes charging terminals for charging the module, and while the wireless device is in its mounted position the module can be mounted on the wireless communication device and charged through the wireless device's charging terminals from electricity drawn by the wireless communication device from the wired communication device's terminals.

* * * * *

UNITED STATES PATENT AND TRADEMARK OFFICE
CERTIFICATE OF CORRECTION

PATENT NO. : 8,229,515 B2
APPLICATION NO. : 13/154557
DATED : July 24, 2012
INVENTOR(S) : Griffin et al.

Page 1 of 1

It is certified that error appears in the above-identified patent and that said Letters Patent is hereby corrected as shown below:

Column 13, line 13, claim 9, please delete "such that"

Signed and Sealed this
Second Day of October, 2012

David J. Kappos
*Director of the United States Patent and Trademark Office*